Patented May 14, 1929.

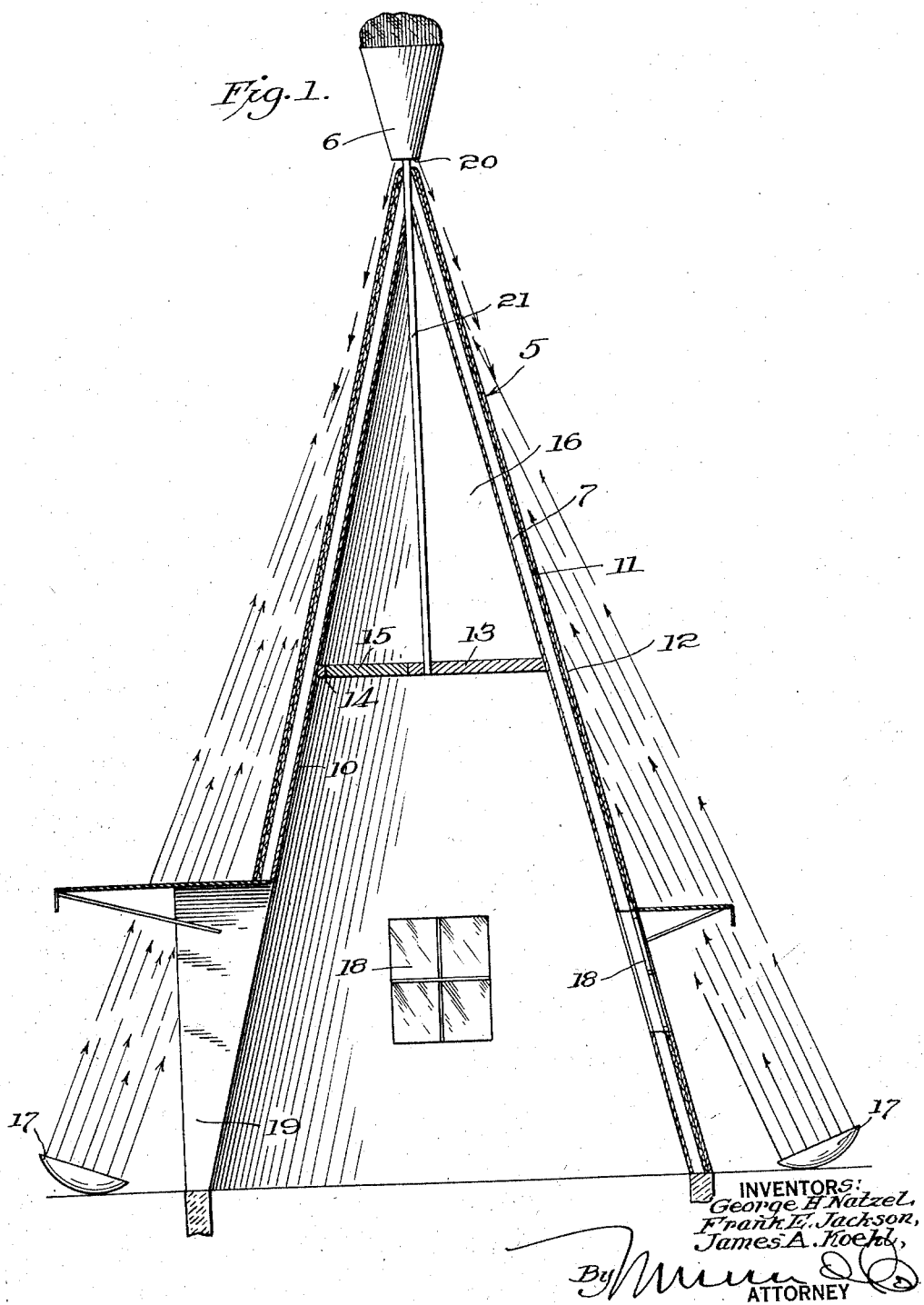

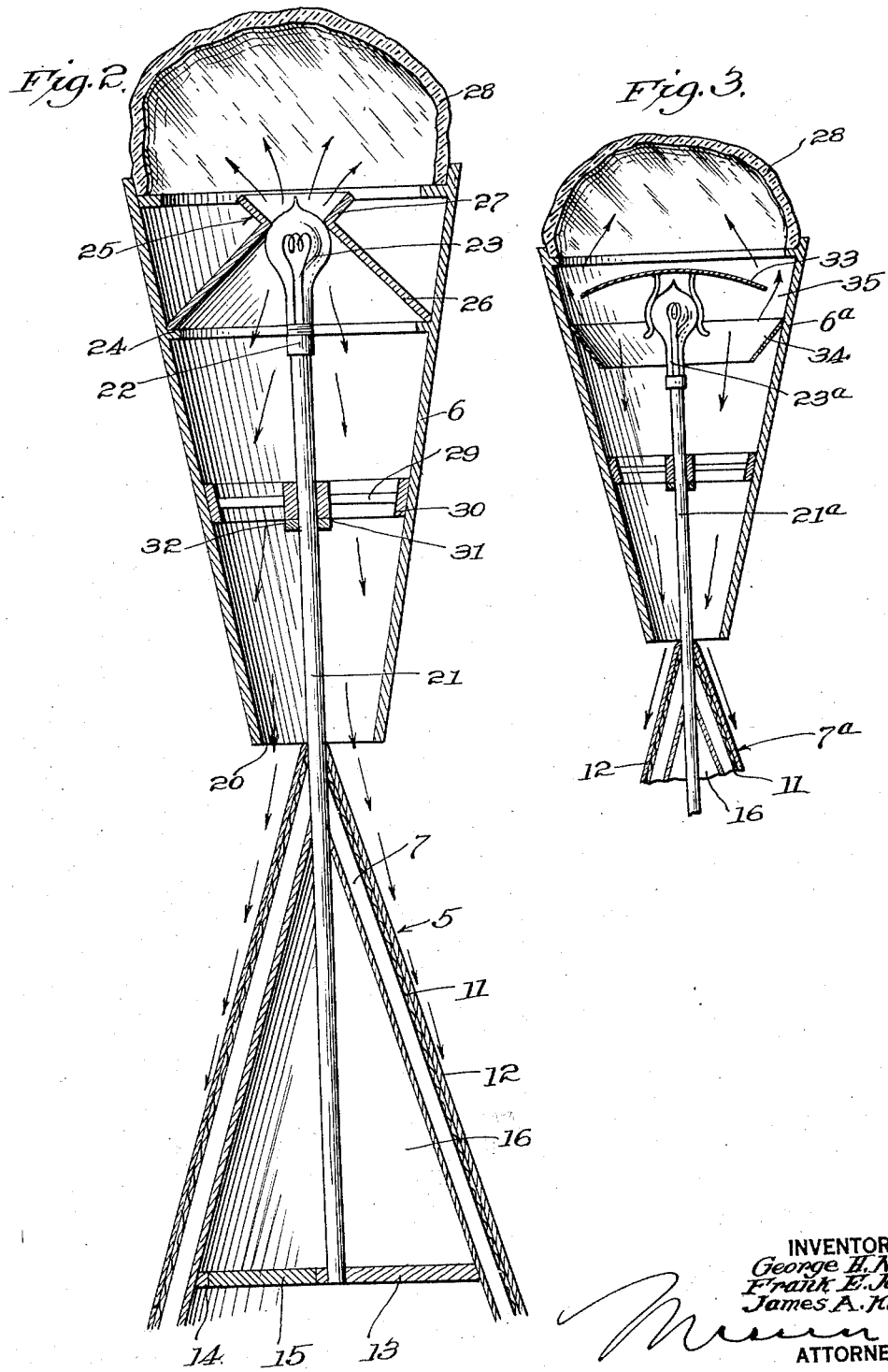

1,713,050

UNITED STATES PATENT OFFICE.

GEORGE H. NATZEL AND FRANK E. JACKSON, OF SANTA ANA, AND JAMES A. KOEHL, OF LOS ANGELES, CALIFORNIA; SAID KOEHL ASSIGNOR TO SAID NATZEL AND SAID JACKSON.

ORNAMENTAL BUILDING.

Application filed April 9, 1928. Serial No. 268,777.

This invention relates to ornamental buildings, and particularly to buildings having certain novel characteristics and architectural outlines that appeal strongly to the esthetic, and render same highly desirable as an advertising means in the vending of merchandise.

An important object of the invention is to provide a structure shaped to depict an edible icecream cone, of the kind made from baked dough stock, and means for casting light upon the structure at night-time, so that the entire structure is uniformly enveloped within a harmonizing light ray that brings out the naturalness of color of the thing depicted.

Another object of the invention is to provide a building designed primarily for the purpose of vending icecream cones, and among the novel embodiments of the invention are means forming the main structure of the building, the same being of conical outline and arranged in association with a novel form of superposed illuminating means which will serve to cause light to be projected, respectively, in various directions so that light projected in one direction will serve to illuminate the exterior of the main structure and with a color scheme that will closely agree with the color of a well-known edible icecream cone formed of dough stock, and wherein light distributed in another direction will illuminate a portion of the superstructure to make it appear as though it contained icecream colored according to a particular flavor.

A further object of the invention is to provide a structure of this character which is strong and durable and one which will have a substantial measure of stability when erected.

In the drawings,

Figure 1 is a view in vertical section of the building;

Figure 2 is a vertical section on an enlarged scale through a portion of the building;

Figure 3 is a section similar to Figure 2, showing a slightly modified form of the invention.

In practice, there is employed a main structure 5 and a super-structure 6.

The main structure is of conical formation and includes an inner frame made up of a suitable number of angularly related beams 7, to the inner surface of which may be secured wall boarding 10, or, and in lieu thereof, this inner surface of the structure may be plastered or finished in any suitable well-known manner. The beams all merge together at the upper end or apex of the structure, and at the base of the structure, the beams are spread apart, so as to give a maximum measure of stability when mounted upon a foundation, at the same time bringing the beams into such relative association that they mutually contribute toward the production of the cone-shaped outline herein set forth. On the outside of the beams is the customary lathing material 11 over which is applied a suitable plastic material 12, and the same is preferably of a color agreeing with that of a baked dough stock from which an edible icecream cone is formed. At some midway point between the ends of the main structure 5 is a ceiling 13, the same having a door opening 14 and a closure 15 for the opening. In this manner, the interior of the structure 5 is provided with a storage space 16 for the reception of icecream containers, cartons and other packages. At the base of the structure and arranged at suitable intervals therearound are electrically-controlled flood lamps 17 of a design that will cast an amber-like color of light in an upward direction against the exterior of the structure, there being a suitable spread of the light beams from the lamp to cause a uniform illumination of the structure, and as illustrated, the pencils of the light beams thus cast upon the structure follow the height of the structure, from the wide base thereof to a point at least closely approaching the apex of the structure. In this manner, the structure is entirely encased within the aforestated beams or rays of light and the color of the exterior of the structure is made to appear natural-like, or in appearance of a color truly simulating the color of baked dough stock.

The base of the structure is provided with suitable windows 18 and a doorway 19.

The structure 6 is substantially frusto-conical, the same being open at its lower end at 20. The longitudinal axis of the structure 6 is in alinement with the longitudinal axis of the structure 5, and as clearly shown, the apices of the two structures substantially join one another, with the inner walls of the structure 6 spaced apart annularly from the walls of the structure 5.

The two structures 5 and 6 are joined together by a rigid member 21 in the form of a metal conduit, the same preferably passing into the structure 5, terminating within the roof 13. Electric wires may be passed through this conduit for a purpose to be hereinafter explained. The conduit 21 extends for an appreciable distance into the structure 6, and it has a socket 22 which may be connected with the electric wires passing into the tubing. In the socket is an electric lamp 23. Associated with the lamp 23 and removably supported upon a ledge 24 within the structure 6 is a reflector body 25 having a flared base 26 and a flared upper portion 27, the lamp 23 being positioned with respect to the two reflector portions so that a light ray may be cast thereupon. At the upper end of the structure 6 and removably associated therewith is a globe 28 formed of glass or any other suitable well-known material and of a selected color, such as brown, orange, strawberry or like colors of various icecreams. The structure 6 may be stuccoed or plastered upon its exterior face, or it may be formed of any suitable well-known material, and is intended to simulate an icecream cone filled with icecream of a certain flavor and color. Therefore, it follows that light rays caught by the portion 27 of the reflector are scattered or projected upward where they are cast against the colored globe 28 to illuminate same. The reflector serves as a partition so that no reflections from the space above are scattered into the space below the reflector. Reflected light from the portion 26 is scattered downward and it is preferred that the lamp 23 be of amber-like color, or it may be of a slightly darker shade, so that it has the effect of giving the appearance of a slightly burnt condition of the depicted icecream cone. The under surface of the portion 26 may be likewise an amber reflecting surface or it may be an ordinary mirror. The light from the space below the reflector 25 finds egress from the open end of the structure 6, and this light, flood-like, is scattered in a downward direction upon the exterior surface of the structure 5, where it merges with the beams of light preferably of corresponding color from the aforementioned lamps 17.

From the description above set forth, the building, in one sense of the invention, is highly artistic, and by merging two light rays or blending same together when sent from respectively opposite directions, casting them upon the exterior of the structure 5, the latter at night time is visibly the color of dough stock from which the common well-known forms of icecream cones are constructed, while and by virtue of the reflecting scheme brought about through the provision of the reflector 25 and the globe 28, there is made to appear a natural-like simulation above the structure 5 of a cone filled with icecream of a given color.

The structure 6 may be supported upon the conduit 21 by means of a spider 29 secured at 30 to the structure and resting at 31 upon a collar 32 on the conduit.

In the modified form of the invention shown in Figure 3, the upper structure 6ᵃ is provided with a conduit 21ᵃ, whose lamp 23ᵃ is associated with an upper concavo-convex reflector 33 and a lower frusto-conical reflector 34, the rim of the reflector 33 terminating short of the walls of the reflector 34, so that a surrounding space 35 is formed about the reflector 33. In this manner, light is reflected upward and against the globe 28 and by virtue of the concavity of the reflector 33 light is reflected downward where it finds escape from the base of the structure 6ᵃ in order that its effect may be spent against the exterior of the under structure 7ᵃ.

We claim as our invention:

1. A building comprising a conical lower structure having doorways and windows, respectively, formed therein, the structure consisting of angularly-arranged beams which come together at the top of the structure, an exterior facing material arranged about the beams, a lamp extending above the structure from the apex thereof, and means within the lamp for causing reflected light to be projected against the exterior of the structure, the facing material being of the color of baked doughstock, so that the building depicts an edible icecream cone.

2. A building comprising a conical lower structure having doorways and windows, respectively, formed therein, the structure consisting of angularly-arranged beams which come together at the top of the structure, an exterior facing material arranged about the beams, a lamp extending above the structure from the apex thereof, means for permitting light to be projected from the lamp in a downward direction against the exterior of the structure, and means for projecting light in an upward direction from the base of the structure, the facing material being of the color of baked doughstock, so that the building depicts an edible icecream cone.

3. A building simulating an edible icecream cone, a lamp rising from the apex of the cone, the said lamp being substantially conical and arranged with its large end uppermost and provided at its large end with a colored globe capable of permitting of an emission of light therefrom, means for causing light to be reflected in an upward direction from within the lamp and against the globe to illuminate the latter and for projecting light in a downward direction and against the exterior of the structure, and means for projecting a harmonizing light in an upward direction against the exterior of such structure.

4. A building including a lower conical structure colored exteriorly to simulate an edible icecream cone of baked doughstock and having doors and windows, respectively, formed therein near its base, and a cone-shaped lamp above the structure arranged with its apex in substantially conjoined relationship to the apex of the structure.

5. A building comprising a conical structure, a superposed substantially inverted conical structure arranged with its small end confronting the apex of the first said structure, means for projecting light in an upward direction upon the exterior surface of the first structure, and means within the second structure for distributing light in a downward direction against the exterior of the first said structure, the two structures arranged with their longitudinal axes in alinement.

6. A building including a structure shaped and colored exteriorly to simulate an edible icecream cone of baked dough stock, a hollow inverted conical structure supported from the apex of the first structure, means for depositing light upon the exterior of the first structure so as to visualize the exterior color thereof, and means for causing an illumination of a portion of the second said structure to depict an icecream cone filled with icecream of a particular color.

7. A building including a structure depicting an icecream cone, and means for casting light upon the whole of the exterior of the structure from a point at the extreme base thereof and of a color shade harmonizing with the color of the aforestated edible icecream cone.

8. A building including a structure having a doorway and windows, respectively, the structure consisting of angularly related beams merging together at the top of the structure, an exterior plastic facing surrounding the structure of the color of baked dough stock and producing with the beams a hollow form depicting an edible icecream cone.

9. A building including a structure of conical formation, the same depicting an edible icecream cone, and means for depositing light upon the exterior of the structure respectively from two directions between the apex and the large end thereof.

GEORGE H. NATZEL.
FRANK E. JACKSON.
JAMES A. KOEHL.